US008073156B2

(12) United States Patent
Hutt et al.

(10) Patent No.: US 8,073,156 B2
(45) Date of Patent: Dec. 6, 2011

(54) VEHICLE LOUDSPEAKER ARRAY

(75) Inventors: Steven W. Hutt, Bloomington, IN (US); D. Broadus Keele, Jr., Bloomington, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 1962 days.

(21) Appl. No.: 11/133,846

(22) Filed: May 19, 2005

(65) Prior Publication Data

US 2005/0259831 A1 Nov. 24, 2005

Related U.S. Application Data

(60) Provisional application No. 60/572,366, filed on May 19, 2004.

(51) Int. Cl.
*H04B 1/00* (2006.01)
*H04R 25/00* (2006.01)
*H04R 5/02* (2006.01)

(52) U.S. Cl. ........... 381/86; 381/302; 381/389; 381/160

(58) Field of Classification Search .................... 381/86, 381/302, 332–336, 389, 160; 181/148, 155, 181/156
See application file for complete search history.

(56) References Cited

U.S. PATENT DOCUMENTS

| | | | | |
|---|---|---|---|---|
| 4,104,641 A | | 8/1978 | Unz | 343/844 |
| 4,344,504 A | | 8/1982 | Howze | 181/187 |
| 4,361,736 A | | 11/1982 | Long et al. | 179/121 |
| 4,503,930 A | | 3/1985 | McDowell | 181/145 |
| 4,653,606 A | | 3/1987 | Flanagan | 181/145 |
| 4,845,759 A | | 7/1989 | Danley | 381/97 |
| 4,991,687 A | | 2/1991 | Oyaba et al. | 181/145 |
| 5,031,220 A | * | 7/1991 | Takagi et al. | 381/86 |
| 5,109,419 A | | 4/1992 | Griesinger | 381/63 |
| 5,148,490 A | * | 9/1992 | Draffen | 381/86 |
| 5,233,664 A | | 8/1993 | Yanagawa et al. | 381/89 |
| 5,526,325 A | | 6/1996 | Sullivan et al. | 367/138 |

(Continued)

FOREIGN PATENT DOCUMENTS

| | | |
|---|---|---|
| EP | 0481163 A2 | 4/1992 |
| EP | 1199907 A2 | 4/2002 |
| GB | 2273847 A | 6/1994 |

(Continued)

OTHER PUBLICATIONS

Shively, R.E. and House, W.N., "Perceived Boundary Effects in an Automotive Vehicle Interior," Presented at 100th Convention May 11-14, 1996, Copenhagen, AES.

(Continued)

*Primary Examiner* — Xu Mei
(74) *Attorney, Agent, or Firm* — Brinks Hofer Gilson & Lione

(57) ABSTRACT

An audio processing system for a vehicle includes a plurality of loudspeakers positioned to form a single line array. The loudspeaker line array is positionable in a vehicle on a dashboard of the vehicle substantially at the convergence of the dashboard and a window of the vehicle. When the loudspeaker line array is driven by an audio signal, a vertically and horizontally focused and narrowed sound pattern is perceived by a listener in the vehicle. The sound pattern is the result of the constructive combination of the direct sound impulses and the reflected sound impulses produced by each loudspeaker in the array. Using delay, attenuation and phase adjustment of the audio signal, the sound pattern may be controlled, limited, and directed to one or more locations in the vehicle.

26 Claims, 7 Drawing Sheets

U.S. PATENT DOCUMENTS

| | | | | |
|---|---|---|---|---|
| 5,802,190 | A | 9/1998 | Ferren | 381/82 |
| 5,870,484 | A | 2/1999 | Greenberger | 381/300 |
| 5,966,453 | A * | 10/1999 | Koyano et al. | 381/86 |
| 6,112,847 | A | 9/2000 | Lehman | 181/152 |
| 6,160,757 | A | 12/2000 | Tager et al. | 367/119 |
| 6,477,255 | B1 * | 11/2002 | Yoshida et al. | 381/86 |
| 6,584,202 | B1 | 6/2003 | Montag et al. | 381/63 |
| 7,343,020 | B2 * | 3/2008 | Thigpen | 381/302 |
| 7,684,574 | B2 * | 3/2010 | Keele et al. | 381/160 |
| 2003/0021433 | A1 * | 1/2003 | Lee | 381/86 |

FOREIGN PATENT DOCUMENTS

| | | |
|---|---|---|
| JP | 59-053000 | 3/1984 |
| JP | 05-227588 | 9/1993 |
| JP | 06-307107 | 1/1994 |
| JP | 06-225379 | 8/1994 |
| WO | WO 01/23104 A2 | 4/2001 |

OTHER PUBLICATIONS

Mingsian R. Bai, Chih-Wei Tung and Chih-Chung Lee, "Optimal Design of Loudspeaker Arrays for Robust Cross-Talk Cancellation Using the Taguchi Method and the Genetic Algorithm," J. Acoust. Soc. Am. 117 (5), May 2005, pp. 2802-2813.

Amar G. Bose, "Sound Recording and Reproduction", Technology Review, vol. 75, No. 7, Jun. 1973.

European Examination Report, dated Jun. 13, 2007, pp. 1-7, European Patent Application No. 05 757 209.1-2225, European Patent Office, Germany.

Canadian Examination Report, dated Apr. 23, 2007, pp. 1-3, Canadian Patent Application No. 2,515,281, Canadian Patent Office, Canada.

Notice Requesting Submission of Opinion w/ English translation, dated Sep. 29, 2006, pp. 1-4, Korean Patent Application No. 10-2005-7018985, Korean Intellectual Property Office, Korea.

Korean Office Action w/English translation, dated May 30, 2007, pp. 1-9, Korean Patent Application No. 10-2005-7018985, Korean Intellectual Property Office, Korea.

Chinese Office Action w/ English translation, dated Oct. 16, 2009, pp. 1-10, Chinese Patent Application No. 200580000128.7, Chinese Patent Office, China.

Japanese Office Action dated Apr. 30, 2008.

* cited by examiner 602 604 606 608

| N | Shift | Delay | # Samples |
|---|---|---|---|
| | | Rounded | at 48 kHz |
| | mm | mSec | |
| 1 | 0.0 | 0.000 | 0 |
| 2 | 0.5 | 0.000 | 0 |
| 3 | 1.5 | 0.000 | 0 |
| 4 | 2.8 | 0.000 | 0 |
| 5 | 4.1 | 0.021 | 1 |
| 6 | 5.8 | 0.021 | 1 |
| 7 | 7.6 | 0.021 | 1 |
| 8 | 9.9 | 0.021 | 1 |
| 9 | 12.2 | 0.042 | 2 |
| 10 | 15.0 | 0.042 | 2 |
| 11 | 17.8 | 0.042 | 2 |
| 12 | 20.8 | 0.062 | 3 |
| 13 | 24.1 | 0.062 | 3 |
| 14 | 27.9 | 0.083 | 4 |
| 15 | 31.8 | 0.083 | 4 |
| 16 | 35.8 | 0.104 | 5 |
| 17 | 40.1 | 0.125 | 6 |
| 18 | 44.7 | 0.125 | 6 |
| 19 | 49.5 | 0.146 | 7 |
| 20 | 54.6 | 0.167 | 8 |
| 21 | 59.7 | 0.167 | 8 |
| 22 | 65.3 | 0.188 | 9 |
| 23 | 71.1 | 0.208 | 10 |
| 24 | 77.0 | 0.229 | 11 |
| 25 | 83.3 | 0.250 | 12 |
| 26 | 89.9 | 0.271 | 13 |
| 27 | 96.5 | 0.292 | 14 |
| 28 | 103.6 | 0.292 | 14 |
| 29 | 110.7 | 0.312 | 15 |
| 30 | 118.1 | 0.354 | 17 |
| 31 | 126.0 | 0.375 | 18 |
| 32 | 133.9 | 0.396 | 19 |
| 33 | 142.0 | 0.417 | 20 |
| 34 | 150.4 | 0.438 | 21 |
| 35 | 159.0 | 0.458 | 22 |
| 36 | 167.9 | 0.500 | 24 |
| 37 | 177.0 | 0.521 | 25 |
| 38 | 186.4 | 0.542 | 26 |
| 39 | 196.1 | 0.562 | 27 |
| 40 | 206.0 | 0.604 | 29 |
| 41 | 216.2 | 0.625 | 30 |
| 42 | 226.3 | 0.667 | 32 |
| 43 | 237.0 | 0.688 | 33 |
| 44 | 247.9 | 0.729 | 35 |
| 45 | 258.8 | 0.750 | 36 |
| 46 | 270.3 | 0.792 | 38 |
| 47 | 281.7 | 0.812 | 39 |
| 48 | 293.6 | 0.854 | 41 |
| 49 | 305.6 | 0.896 | 43 |
| 50 | 317.8 | 0.917 | 44 |
| 51 | 330.5 | 0.958 | 46 |
| 52 | 343.2 | 1.000 | 48 |
| 53 | 356.1 | 1.042 | 50 |
| 54 | 369.3 | 1.083 | 52 |

FIG. 6

VEHICLE LOUDSPEAKER ARRAY

PRIORITY CLAIM

This application claims the benefit of U.S. Provisional Application No. 60/572,366, filed May 19, 2004. The entire disclosure of U.S. Provisional Application No. 60/572,366 is incorporated herein by reference.

BACKGROUND OF THE INVENTION

1. Technical Field

The invention generally relates to loudspeakers. More particularly, the invention relates to a loudspeaker array in a vehicle.

2. Related Art

Loudspeaker line array technology has been used for numerous years. Typically loudspeaker line arrays are used in sound reinforcement systems. In their simplest form, the interaction of adjacent line-array transducers modifies the total acoustic radiation characteristics of the line array. In commercial applications, the major axis of the line array is usually oriented vertically. An example vertically oriented line array is the JBL Pro VerTec loudspeaker arrays used in large performance venues.

Vehicles typically include some form of audio system having loudspeakers. Tuning and optimization of audio systems in vehicles is usually more difficult than in a typical room such as in a home. In a vehicle, loudspeakers must be placed where space is made available by the vehicle manufacturer, instead of at the optimum listening location, such as the typical location of loudspeakers in a home theater system. In addition, barriers, such as the front seats, passengers, etc., create obstructions to the sound waves emanated from loudspeakers. Further, glass, plastic and other highly reflective surfaces as well as seats, headliners, etc. that create sound absorptive surfaces tend to create sound fields that are less than desirable. Reflected sound may be out of phase with the sound waves emanating from a loudspeaker and may cause comb filtering. In addition, absorption of the sound may eliminate frequencies or ranges of frequencies. As a result, the image formed by the stereo sound may be imprecise, and/or have other less desirable characteristics.

SUMMARY

This invention provides a loudspeaker array in a vehicle. The loudspeaker array may be operated in a vehicle with an audio system that includes the array of transducers and associated amplifier(s) to create single, stereo, or multi-channel sound field images for listeners positioned in the vehicle. The transducer array may be composed of a plurality of wideband miniature loudspeakers that may be located at the intersection of a window in the vehicle, such as the windshield, and a horizontal shelf or dashboard positioned in a vehicle, such as an instrument panel dashboard. In other words, the array of loudspeakers may be positioned substantially at the convergence of the window and the dashboard.

The array may be driven by one or more audio signals provided by a bank of multi-channel processor-controlled automotive amplifiers capable of providing separate processor/amplifier power to each loudspeaker in the array. By being positioned to longitudinally extend in a single line horizontally across a vehicle, the array may provide pin-point imaging laterally across the array. In other words, although the sound may actually be emanating from each of the loudspeakers, from a listener's perspective the sound is perceived to be emanating from the loudspeaker that is located directly in front of (or behind) the listener when the array is driven with a mono signal. Similarly, when the array is driven with a stereo signal the pin-point imaging may be selected to be positioned anywhere on the array based on the phase/delay and the amplitude of the emanated sound.

Due to the physical positioning of the array, and the relatively small diameter loudspeakers included in the array, the horizontal coverage pattern of the sound field may effectively narrow and focus the sound field imaging. In addition the vertical coverage pattern may be widened; however the image perceived by a listener may be narrowed due to the position of the array with respect to the reflective surface. Since a passenger in a vehicle will be within the near field of the loudspeaker array, the sharpness of imaging may also be greatly enhanced. In other words, a listener in a vehicle may hear different sections of the array. Accordingly, when different sections of the loudspeaker array are driven by multi-channel audio signals, such as left and right stereo signals, distinct and separate imaging of the individual channels may be achieved. The distinct and separate imaging may be achieved with minimal cross talk due to the laterally narrowed and focused sound field imaging produced by the loudspeaker array. In addition, the distinct and separate imaging may be achieved by the perceived vertically narrowed and focused sound field produced by the combination of the direct and reflected sound.

Different audio signal processing configurations may also be used to further control the coverage pattern of the sound field produced by the array of loudspeakers. For example, signal delay may be used to focus audio content produced by the array at the driver and/or passenger locations. Amplitude shading may also be used to minimize crosstalk and further focus the array. Selective application of delay, amplitude shading and inversion to the audio signals driving the loudspeakers in the array may form privacy zones for one or more passengers in a vehicle.

Other systems, methods, features and advantages of the invention will be, or will become, apparent to one with skill in the art upon examination of the following figures and detailed description. It is intended that all such additional systems, methods, features and advantages be included within the description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like references numerals designate corresponding parts throughout the different views.

FIG. 6 is a table of a set of delay parameters to allow aiming of the loudspeaker array depicted in FIG. 5 in a determined direction.

DETAILED DESCRIPTION OF THE PREFERRED EMBODIMENTS

Figure 1:
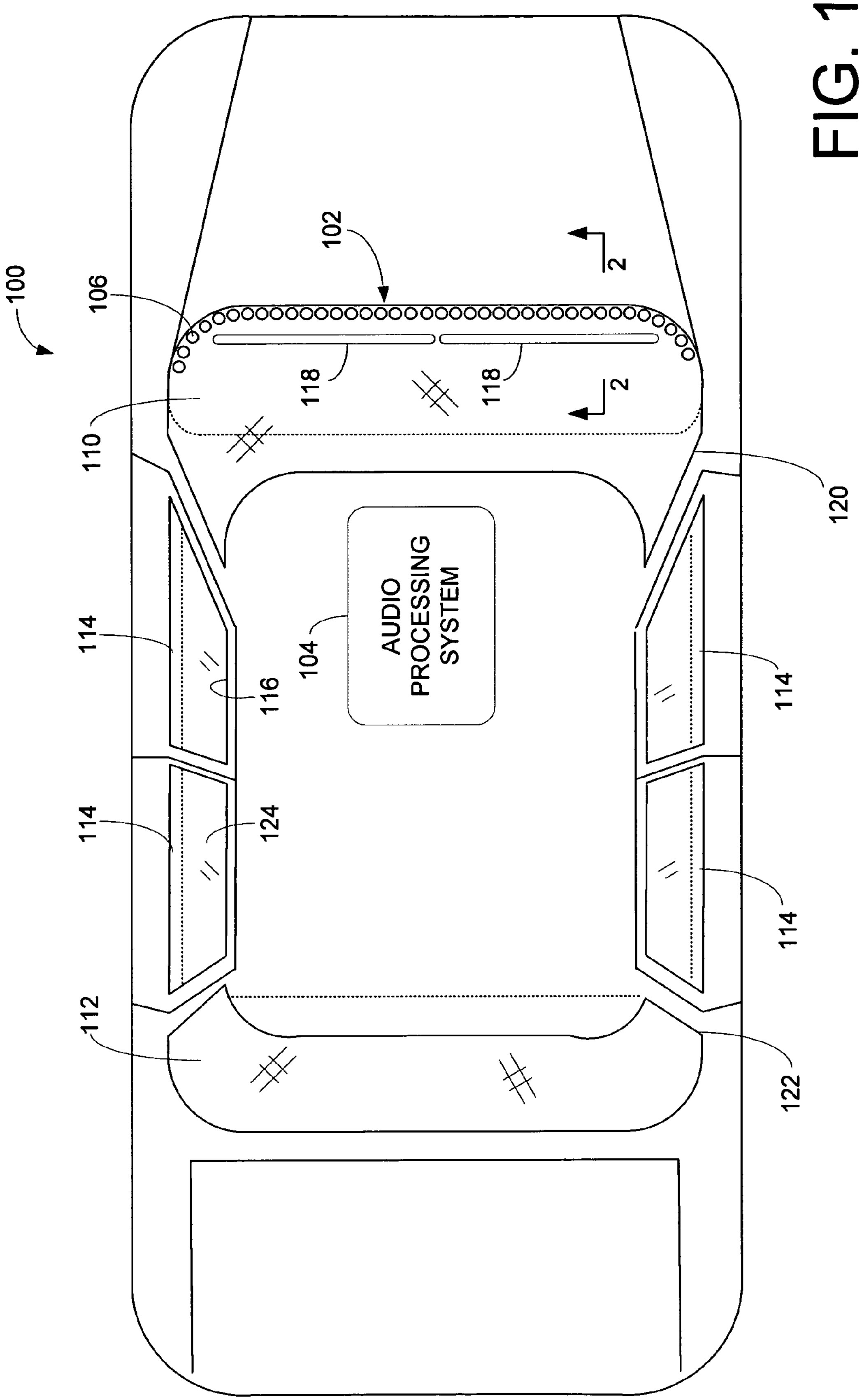
FIG. 1 is a plan view of an example vehicle that includes a sound system.

FIG. 1 is a plan view of a vehicle that includes an audio system 100. In the illustrated example, the vehicle is a passenger automobile, although other types of vehicles, such as trucks, buses, boats, motorcycles, and airplanes are possible in other examples. While a particular example configuration is shown, other configurations may be used including those with fewer or additional audio system components. The audio system 100 includes a single line loudspeaker line array 102 and an audio processing system 104.

The loudspeaker line array 102 includes a plurality of loudspeakers 106. The loudspeaker line array 102 includes at least four loudspeakers 106 that are aligned to form a single row. Other configurations of loudspeaker line arrays may also be used, such as multiple lines of loudspeakers within an array, or configurations in which the loudspeakers in the line array are positioned substantially non-linear with respect to each other, such as offset in the horizontal and/or vertical direction. In addition, one or more loudspeaker line arrays may be positioned at various locations within the vehicle.

The loudspeakers 106 in the loudspeaker line array 102 may be broadband, such as 20 Hz to 20 kHz. In addition, the loudspeakers 106 may be small in diameter, such as about 12.5 mm in diameter, 30.0 mm in diameter, or any other diameter up to about 50.0 mm. Construction of the loudspeakers 106 may include a panel attached to one or more exciters, and/or no enclosure. Other loudspeakers 106 may be used, such as those that include an enclosure. In addition, the exciter(s) may include transducers and/or drivers, such as transducers coupled with cones or diaphragms. Further, the loudspeakers 106 may be, or may include, an electro-dynamic planar loudspeaker having a radiating surface with a minor axis of 50 mm or less and a major axis of any length. An example loudspeaker is the Odyssey 1 or Odyssey 2 loudspeaker manufactured by Harman Multimedia. Harman Multimedia is a division of Harman International Industries Incorporated of Northridge, Calif.

The audio processing system 104 may be any combination of hardware and software capable of generating amplified audio signals to drive a loudspeaker. The audio processing system 104 may include a variety of audio components such as radios, telephones, game counsels, CDs, DVDs, their derivatives, such as super audio, blu-ray and high definition, and the like. The audio processing system 104 may utilize or produce 1-channel source material (mono), 2-channel source material such as left and right stereo audio signals, 5.1 channel audio signals, 6 channel audio signals, 7.1 channel audio signals, and/or any other source materials. The audio processing system 104 may control the amplitude, phase, mixing ratios, equalization, etc. of the audio signals used to drive the loudspeakers 106. Information from a data bus included in the vehicle, microphones, and/or any other transduction devices may be used with the audio processing system 104 to control the mixing and aiming parameters.

Each of the loudspeakers 106 in the loudspeaker line array 102 may be driven by an audio signal provided by a separate channel of an audio amplifier included in the audio processing system 104. Alternatively, multiple loudspeakers 106 may be driven simultaneously by an audio signal provided from a single channel of an audio amplifier. The multiple loudspeakers 106 may be grouped to be adjacently located loudspeakers 106. Alternatively, the multiple loudspeakers 106 may be scattered symmetrically or un-symmetrically within the loudspeaker line array 102. Each channel of the amplifiers may also include a processor, such as a digital signal processor (DSP), that can provide sophisticated processing including equalization, filtering, delay, and limiter/compression capability. For example, the frequency response of the loudspeaker line array 102 may be equalized for a flat response at one or more listener locations within the vehicle.

The vehicle may also include front speakers, side speakers, rear speakers, one or more subwoofers, seatback speakers, etc. that are driven by the audio processing system 104 to cooperatively operate with the loudspeaker line array 102. These other speakers may include one or more speaker drivers of a predetermined range of frequency response such as a tweeter, a mid-range or a woofer.

The audio processing system 104 may also include processing, such as digital signal processing (DSP) technology, to control the acoustic radiation characteristics of the loudspeaker line array 102. Specifically, signal delay and/or amplitude/phase modifications may be used to change the coverage pattern of the loudspeaker line array 102. The processing may also allow interactive aiming of the loudspeaker line array 102 to cover one or more specific audience areas within a vehicle. Signal delay and/or amplitude shading may be applied to the loudspeakers 106 in the loudspeaker line array 102 to effectively change the shape of acoustic radiation from the array by modifying the interaction of the sound waves between individual transducers.

In addition, more complicated algorithms may be applied that superimpose multiple coverage pattern characteristics on the loudspeaker line array 102 at the same time. The multiple coverage pattern characteristics may allow sound fields to be tailored to multiple listening locations (seats) in the vehicle simultaneously. Additionally, null zones may be created by management of the phase relation between the loudspeakers 106 in the loudspeaker line array 102. Thus, zoned audio may be created.

The zoned audio may be limited by bandwidth limitations that limit the coverage pattern control range by the ratio of array dimensions vs. wavelength. An illustrative example of such zoned audio would be the capability of listening to two talk radio shows in two different seats in a vehicle at the same time, without acoustic overlap. This would provide individual audio privacy, as if the listeners were wearing headphones. The capability to create zoned audio and null zones, may also greatly contribute to hands-free telephone communication. For example, zoned audio may provide passenger privacy from the conversation of the driver with a third party in a hands-free telephone conversation. The privacy may be enabled by the driver upon receiving an incoming telephone call by enabling a “privacy mode” using zoned audio and null zones.

The illustrated vehicle includes a number of substantially flat surfaces that converge at a peripheral edge with a sound reflective surface that is glass. For example, a vehicle typically has horizontal shelves that include an instrument panel dashboard 110, a rear dashboard 112, side window dashboards 114 and a headliner dashboard 116. The loudspeaker line array 102 may be positioned in/on one or more of the horizontal shelves proximate to the adjacently located reflective surface. Accordingly, the line formed by the longitudinally extending loudspeaker line array 102 may be substantially parallel with nearby sound reflective surfaces.

In the illustrated example, the loudspeaker line array 102 is positioned in a narrow, shallow area on the instrument panel dashboard 110 between one or more defrost vents 118 and a windshield 120. This area desirably does not conflict with mechanical or industrial design territory utilized by the manufacturer of the vehicle. In one example, the loudspeaker line array 102 includes five loudspeakers 106 that are equidistantly spaced across the entire instrument panel dashboard 110 so that a first loudspeaker 106 is positioned near one side of the vehicle, a second loudspeaker 106 is positioned near the opposite side of the vehicle, and a third, fourth, and fifth loudspeaker 106 are positioned equidistantly between the first and second loudspeakers 106 to form a single horizontal line. In another example, a large number of loudspeakers 106 may be positioned contiguously to form a single line stretching horizontally from one side of the vehicle to the opposite side of the vehicle as illustrated in FIG. 1. In still other examples, any number of loudspeakers 106 may be spaced equidistantly across the vehicle to form a single horizontal line. In other examples, at least a portion of the loudspeakers 106 may not be positioned equidistantly from each other.

Since the instrument panel dashboard 110 must fit within the cabin of the vehicle, the instrument panel dashboard 110 extends substantially across the width of the vehicle. For example, the instrument panel dashboard may be 5-10 mm shorter than the inside diameter of the vehicle cabin. In addition, since the loudspeaker line array 102 may not extend completely to the opposite edges of the instrument panel dashboard, the loudspeaker line array 102 may substantially extend almost the full width of the vehicle. For example, a proximate and a distal end of the loudspeaker line array 102 may be positioned 10-30 mm away from the boundary provided by the interior wall of the vehicle cabin.

The loudspeaker line array 106 may form a line that is substantially parallel to the windshield 120. In one example, the line formed by the loudspeaker line array 106 may be a straight line. In another example, the loudspeaker line array 106 may form a line with a predetermined radius of curvature. In still another example, the loudspeaker line array 106 may form a line that includes a plurality of different, or the same, radii of curvature. In yet another example, the loudspeaker line array 106 may form a line with at least one straight section and at least one section with a radius of curvature.

The positioning of the loudspeaker line array 102 in close proximity to the convergence of the instrument panel dashboard 110 and the windshield 120 may reduce the need for other loudspeaker locations, and avoid conflicts related to available per-vehicle equipment locations. In addition, due to the close proximity of an angled, sound reflective surface provided by the windshield 120, the loudspeaker line array 102 may be optimized for sound imaging, and to provide a well-defined image.

In another example, or in addition, the loudspeaker line array 102 may be positioned in the rear deck dashboard 112 in close proximity to a rear windshield 122 of the vehicle. In still another example, or in addition, the loudspeaker line array 102 may be positioned in one or more of the side window dashboards 114 in close proximity to a corresponding side windshield 124. With a loudspeaker line array 102 positioned in multiple side window dashboards 114 on the same side of the vehicle, each side window dashboard 114 may have an individual loudspeaker line array 102, or a single loudspeaker line array 102 may be split among the multiple side window dashboards 114. In yet another example, or in addition, the loudspeaker line array 102 may be positioned in the headliner dashboard 116 in close proximity to one or more corresponding side windshields 124.

Figure 2:
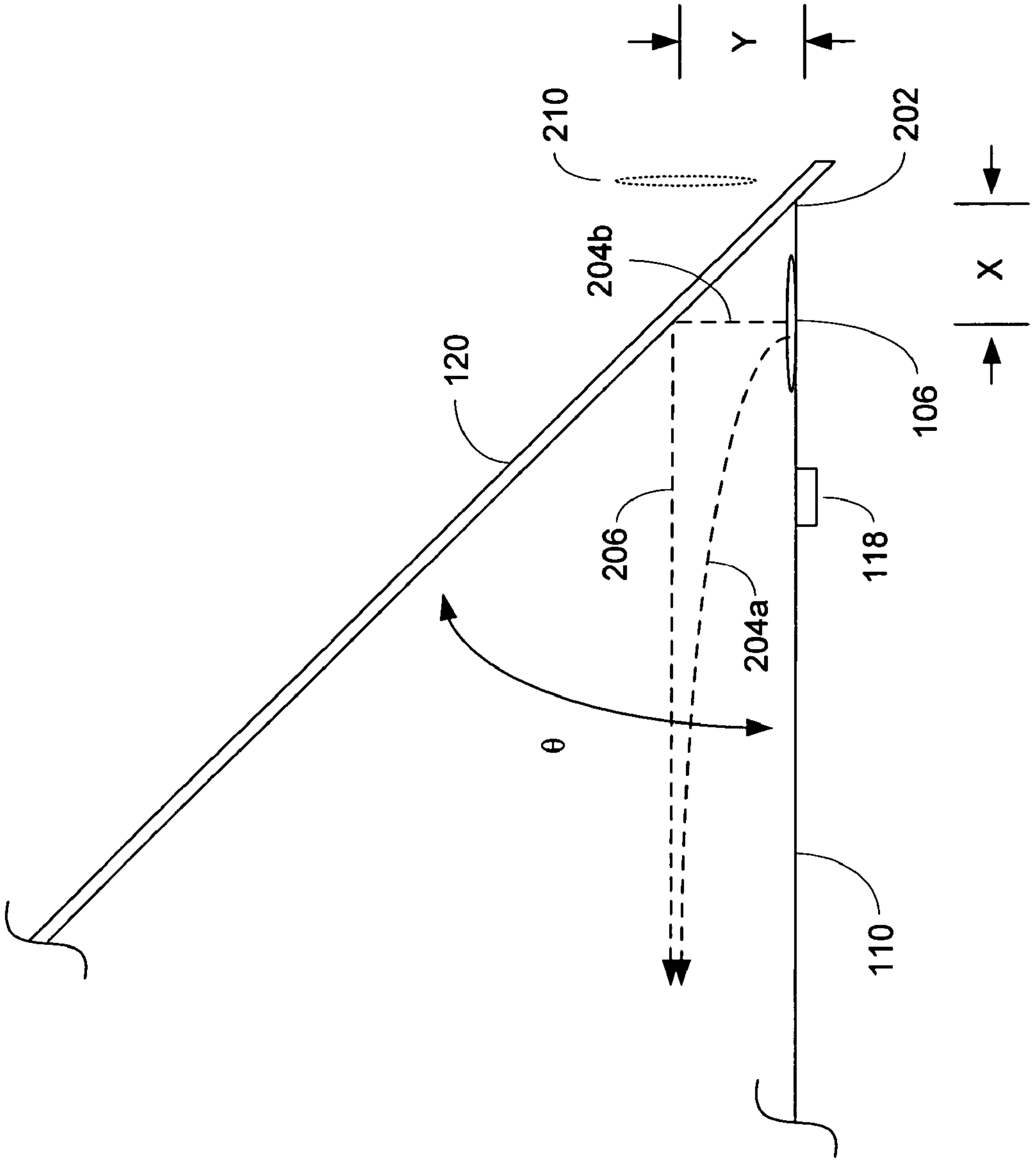
FIG. 2 is a block diagram of a portion of an example vehicle and sound system.

FIG. 2 is a block diagram cutaway view of a portion of the vehicle illustrated in FIG. 1 that includes the instrument panel dashboard 110, the windshield 120 and one of the loudspeakers 106 of the loudspeaker line array 102. For purposes of clarity, only one loudspeaker 106 of the loudspeaker line array 102 is illustrated, however all the loudspeakers 106 in the loudspeaker array may be similarly illustrated and described. The loudspeaker 106 is strategically positioned between the defroster vent 118 and a point of intersection 202 of the instrument panel dashboard 110 and the windshield 120. In the illustrated example, the loudspeaker 106 is spaced away from the intersection point 202 by a predetermined distance "X." As described later, the loudspeaker 106 may be positioned in close proximity to the point of intersection 202 to achieve desirable vertically widened pattern coverage while providing vertical narrowing of the sound field perceived by a listener. Accordingly, the predetermined distance "X" may be as small as possible and can be only that amount of distance required to accommodate the physical dimensions of the loudspeaker 106.

Typically, the surface of the instrument panel dashboard 110 and the surface of the windshield 120 do not actually intersect but rather converge at the point of intersection 202. This point of convergence is typically along a peripheral edge of the instrument panel dashboard 110 and a portion of the surface of the windshield 120. Accordingly, an angle ($\theta$) between the instrument panel dashboard 110 and the windshield 120 extending above the instrument panel dashboard 110 is formed based on the rake, or slope of the windshield 120 with respect to the instrument panel dashboard 110.

The loudspeaker 106 may be mounted in the instrument panel dashboard 110 with a front surface of the loudspeaker 106 substantially parallel to the surface of the instrument panel dashboard 110 and facing substantially vertically. Since the instrument panel dashboard 110 may be formed with various elevations and features, the loudspeaker line array 102 is substantially parallel with the instrument panel dashboard 110. The front surface of each of the loudspeakers 106 may also be at least partially facing the windshield 120. When each of the loudspeakers 106 in the loudspeaker line array 102 is driven with an audio signal, sound waves will emanate from the front surface of each of the loudspeakers 106.

Due to the omni-directional nature of the loudspeakers 106, sound waves emanated from the loudspeakers 106 may be identified as direct sound impulses 204 and reflected sound impulses 206. In addition, due to the relatively small diameter of the loudspeakers 106, such as 19 mm, the impulses 204 and 206 are relatively large amplitude and relatively short duration when compared to larger diameter loudspeakers, such as 90 mm diameter loudspeaker. A portion of the direct sound impulses 204*a* may be sound waves that are not reflected or otherwise impeded by sound reflective and/or sound absorbing surfaces. The reflected sound impulses 206 may be created by the reflection of some of the direct sound impulses 204*b* by the windshield 120. As a result of the reflection, a virtual loudspeaker 210 is created on the opposite side of the windshield 120 from where the loudspeaker 106 is located.

The virtual loudspeaker 210 is rotated to a substantially vertical position. The position of the virtual loudspeaker 210 may be substantially vertical due to the angle of the windshield 120. The angle of the windshield 120 may vary between about 30 degrees and about 90 degrees. At a windshield angle of 45 degrees, for example, the front surface of the virtual loudspeaker 210 is perpendicular to the front surface of the loudspeaker 106. If the angle of the windshield is less than 45 degrees, the front surface of the virtual loudspeaker 210 may be angled toward the instrument panel dashboard 110. If on the other hand, the angle of the windshield 120 is greater than 45 degrees, the front face of the virtual loudspeaker 210 may be angled away from the instrument panel dashboard 110.

The virtual loudspeaker 210 may provide the reflected sound impulses 206 at a vertical distance "Y" above the instrument panel dashboard 110. The vertical distance is based on the distance between the front surface of the loudspeaker 106 and the surface of the windshield 120. In addition, the vertical distance is due to the angle (θ) of the windshield 120, such as 30 degrees, 35 degrees, 40 degrees, 45 degrees and 50 degrees. Due to the reflection, the path of the reflected sound impulses 206 is slightly longer than the path of the direct sound impulses 204. In other words, there can be some phase difference between the direct sound impulses 204 and the reflected sound impulses 206.

To minimize the phase difference, the loudspeaker 106 may be positioned substantially at the intersection 202. Due to physical loudspeaker mounting constraints, the loudspeaker 106 may be mounted proximate, adjoining or juxtaposed to the intersection 202, at a location that is substantially at the intersection 202. Minimization of the phase difference may be achieved by minimizing the difference in path length between the direct sound impulses 204*a* and the reflected sound impulses 206.

Minimization of the phase difference allows the direct sound impulses 204*a* and the reflected sound impulses 206 from the same loudspeaker 106 to be constructively combined substantially in phase to form a perceived single sound source. "Substantially in phase" is defined as a phase shift between frequencies that is less than 90 degrees between about 100 Hz and about 10 kHz. The perceived single sound source also creates the perception by a listener of a resulting vertical sound field that is narrowed and focused due to the relatively close proximity of the loudspeaker 106 and the virtual loudspeaker 210. Due to the combination of the direct and reflected sound impulses 204 and 206, however, the vertical coverage is actually widened. Accordingly, variations in listener height with respect to the loudspeaker line array still provides the perceived effect of a narrowed, focused and well-defined vertical sound field.

Each of the loudspeakers 106 in the loudspeaker line array 102 may constructively combine the direct sound impulses 204*a* of the loudspeaker 106 with reflected sound impulses 206 of the same loudspeaker 106. Thus, the magnitude of the direct and reflected sound is substantially similar. "Constructive combination" of impulses is defined as the combination of two sound waves to form a sound wave with a frequency response deviation that averages less than +/−5 dB between about 100 Hz and about 10 kHz.

As a result of the combination of "two" audio sources (the actual and virtual loudspeakers), the sensitivity and the sound output may be doubled in magnitude. Due to the close proximity of the angled sound reflective surface of the windshield 120, the vertical sound coverage is widened, while a perceived sound field is a vertically narrowed, sharp, well-defined image. In addition, due to the single line loudspeaker array configuration, the perceived sound image is also horizontally sharp. Accordingly, the resulting coverage pattern produced by the loudspeaker line array 102 is a sound field perceived by a listener to be narrowed and focused both vertically and laterally. Due to the vertically and laterally focused sound field, imaging and perception of sound images produced by the loudspeaker line array 102 may be extremely sharp, clear, well defined, and of a finite size.

In a vehicle, the loudspeaker line array 102 may be oriented with its major axis horizontal. In this orientation, the loudspeaker line array 102 may be enabled to provide coverage pattern control along the horizontal axis. In addition, the location of the loudspeaker line array 102 in close proximity, adjoining or juxtaposed to the intersection 202 of the instrument panel (IP) dashboard 110 and the windshield 120 forms acoustic reflections or virtual (mirror) images of each of the loudspeakers 106 in the loudspeaker line array 102. As a result, the effective sensitivity and maximum output of the loudspeaker line array 102 is increased. In addition, the loudspeaker line array 102 may also include coverage pattern control in the horizontal axis and perceived coverage pattern control in the vertical axis. For optimal coverage the distance between adjacent loudspeakers 106 can be calculated vs. the acoustic wavelength of the reproduced frequencies. The side-to-side and up-down variation in frequency response of the loudspeaker line array 102 may also be monitored and effectively controlled.

Figure 3:
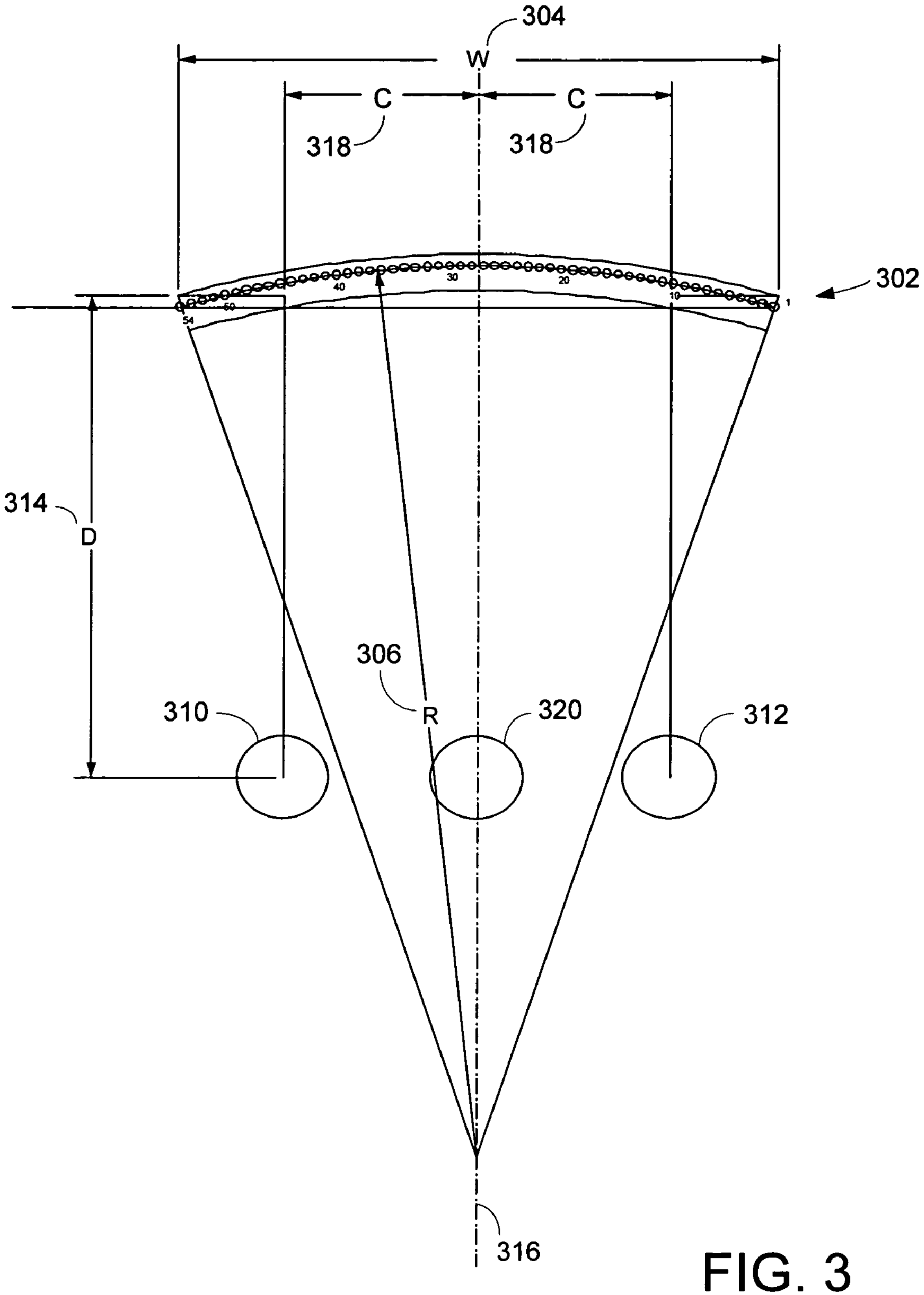
FIG. 3 is a schematic diagram of an example loudspeaker array as depicted in FIG. 1.

FIG. 3 is a schematic illustrating an example curved loudspeaker line array 302 mounted in a vehicle. In this example, the loudspeaker line array 302 includes fifty four contiguously aligned loudspeakers that are positioned on an instrument panel dashboard to form a single line loudspeaker array in close proximity to a windshield of a vehicle as previously described. In other examples any other number of loudspeakers may form the loudspeaker line array 302 in other previously described locations in a vehicle. The loudspeaker line array 302 may have a determined width (W) 304 that is substantially the width of the vehicle. Other widths may be used, such as a portion of the width of the vehicle. The loudspeaker line array 302 may be positioned to form a determined radius of curvature (R) 306 that corresponds to the radius of curvature of the windshield of the vehicle. In the illustrated example, the width (W) 304 may be about 1146 cm and the radius of curvature (R) 306 may about 1870 cm based on the width (W) 304. In other examples, the radius of curvature (R) 306 may be less than 2 meters and the width (W) 304 may be less than 1.5 meters. Each of the loudspeakers in the example loudspeaker line array 302 is a 19 mm diameter wide-band driver (about 350 Hz to about 20 kHz).

The loudspeaker line array 302 may be mounted in the instrument panel dashboard. Alternatively, the loudspeaker line array 302 may use fifty-four individual modular loudspeaker/enclosure combinations. The loudspeakers in the array may be contiguously positioned with predetermined center-to-center lateral spacing. The center-to-center lateral spacing of the loudspeakers in the example loudspeaker line array 302 is about 21.6 mm. The audio signals driving the loudspeaker line array 302 may also drive other loudspeakers positioned away from the loudspeaker line array 302, such as 200 mm woofers positioned in the front doors of the vehicle. The audio signals provided to the other loudspeakers may be filtered. Loudspeakers that are woofers for example, may receive audio signals that are high pass filtered at about 400 Hz.

In FIG. 3, a front driver position 310 and a front passenger position 312 are also illustrated. The positions 310 and 312 are positioned a determined range of distance (D) 314 depending on the slidable location of the front seats of the vehicle. The distance (D) is positioned within the near field of the loudspeaker line array 302. The nearfield of a loudspeaker is determined based on the size of the sound source. In the case of single line loudspeaker array, the size of the sound source may be the length of the loudspeaker array. Each of the positions 310 and 312 are also away from a central axis 316 of the loudspeaker line array 302 by a determined distance (C) 318. In the illustrated example, the determined distance (C) 318 is about 37 cm.

Objective and subjective performance testing was performed using the loudspeaker line array 302 in a various configurations. In a first example configuration, a single audio signal (mono) was used to drive the entire loudspeaker line array 302. In this example, good coverage of all points across the front seating area of the vehicle was experienced. The perceived sound source width was relatively narrow and was perceived to come from a single loudspeaker in the loudspeaker line array 302. As the listener moved horizontally from side to side in front of the loudspeaker line array 302, the sound source appeared to always originate from a point directly in front of the listener due to the narrowed and focused lateral coverage pattern of the sound field being produced. Accordingly, when the listener is positioned along the central axis 316 of the loudspeaker line array 302, centered mono sources were particularly effective audio source material because they may sound like they are coming from the exact center of the loudspeaker line array 302, as if only a center loudspeaker (loudspeaker 27 in the illustrated example) of the loudspeaker line array 302 were operating, while a listener is actually receiving the horizontal and vertical coverage pattern of the entire loudspeaker line array 302.

Figure 4:
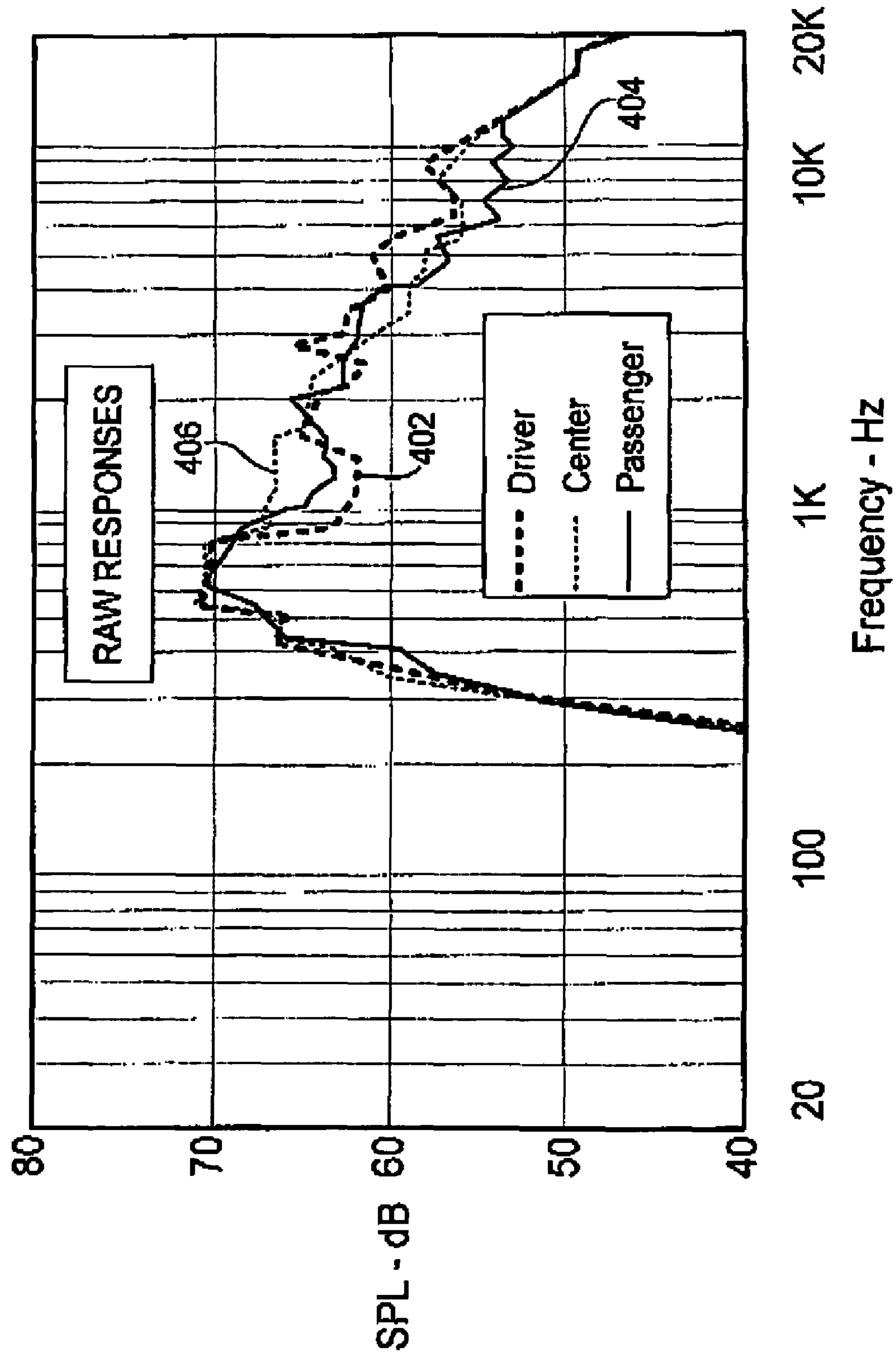
FIG. 4 is a frequency response graph for an example loudspeaker array in a vehicle.

FIG. 4 is a set of frequency response curves based on driving the entire loudspeaker line array 302 of FIG. 3 with a single (mono) audio signal that is not equalized. In FIG. 4, a first unequalized frequency response 402 of the loudspeaker line array 302 at the front driver position 310 is illustrated. In addition, an unequalized frequency response 404 at the front passenger position 312 is also illustrated. Finally, an unequalized frequency response 406 at a center position 320 located on the central axis 316 at distance (D) 314 (FIG. 3) is illustrated.

As is readily apparent, use of the loudspeaker line array 302 has dramatically reduced the amount of deviation in frequency response that would otherwise be present in many conventional audio systems in vehicles. Each of the frequency responses of the loudspeaker line array 302 at the front driver position 310, the center position 320, and the front passenger position 312 are substantially similar due to the narrowed and focused vertical and lateral coverage pattern of the sound field provided by the loudspeaker line array 302. Raw frequency responses of the loudspeaker array at the front driver position 310, the center position 320, and the front passenger position 312 may include a 3-dB/octave high-frequency roll off as illustrated. The roll off may be due to the curvature of the loudspeaker line array 302. The response of a single loudspeaker in the loudspeaker line array 302 may be essentially flat.

In FIG. 3, in another example configuration, the loudspeaker line array 302 may be driven in stereo with the right half of the array (drivers 1-27) fed by the right audio channel and the left half of the array (drivers 28-54) fed by the left audio channel. In this example configuration, no delay or shading of the individual loudspeakers in the array was in effect, however equalization may be used to correct for the 3-dB/octave high-frequency roll off. With stereo program material, a distinctly different sound field effect was experience with loudspeaker line array 302 than with a mono signal. When listening from the center or near center position 320, a sharp, well-defined stereo image was created with pinpoint stereo images of panned signals all across the width of the loudspeaker line array 302.

Center stereo images may also be particular impressive because the image may similarly be perceived by the listener to originate from a single loudspeaker 106 at substantially the center of the instrument panel dashboard due to the horizontal narrowed and focused coverage pattern of the loudspeakers in the loudspeaker line array 302. In addition, due to the perceived vertically narrowed and focused coverage pattern created with the reflected acoustic sound, imaging may be perceived by the listener to originate from the combination of the loudspeaker line array and the reflected acoustic sound irrespective of the elevation of the listener with respect to the loudspeaker line array 302.

The perception of well-defined, pinpoint stereo images was based on the directional characteristics of the loudspeaker line array 302 created by the narrow and focused sound field. In addition, the narrowed and focused sound field may allow a listener to hear sound emanating from different portions of the loudspeaker line array 302. In other words, due to the vertically and horizontally tight and focused beam like nature of the perceived sound field produced by the individual loudspeakers 106, different loudspeakers 106, or sections of loudspeakers 106 in the array may be heard by each ear of a listener. Accordingly, the directionality of the narrowed and focused sound field may effectively provide cross talk cancellation by maintaining separation of respective beams of the left and right stereo signals. In other words, the left half of the loudspeaker line array 302 may provide a sound field for the left ear of a listener and the right half of the loudspeaker line array 302 may provide a sound field for the right ear of the listener.

Figure 5:
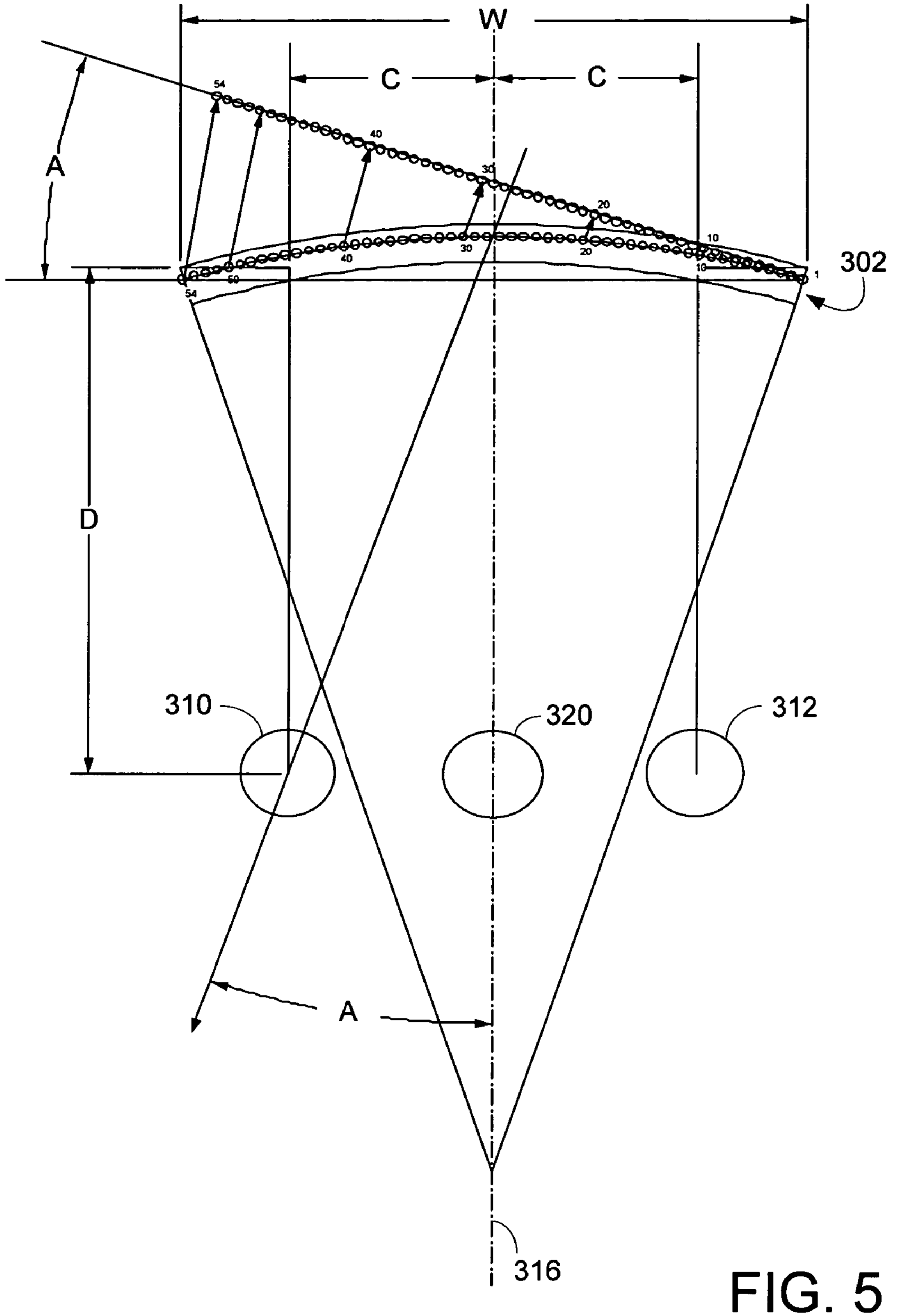
FIG. 5 is a schematic diagram of another example loudspeaker array as depicted in FIG. 1.

FIG. 5 is a schematic diagram of the loudspeaker line array 302 in another example configuration. Similar to the previous example configuration, the loudspeaker line array 302 may be driven in stereo with the right half of the array (drivers 1-27) fed by the right audio channel and the left half of the array (drivers 28-54) fed by the left audio channel. In this example, however, in order to improve the stereo imaging at the front driver location 310, the loudspeaker line array 302 may be both straightened and aimed at the front driver position 310. Straightening and aiming the loudspeaker line array 302 may be performed by the use of delays. Selective delay of each of the audio signals driving each of the loudspeakers in the loudspeaker line array 302 may be used to steer and/or aim the soundfield/imaging produced by the array.

Signal processing delay of the audio signals used to drive the loudspeaker line array 302 may be used to both straighten and aim the loudspeaker line array 302 at the positions 310 and 312. Alternatively, the loudspeaker line array 302 may be straightened to be aimed at the central position 320 or any other location in the vehicle. The loudspeaker line array 302 was straightened and aimed at a determine angle (A) 502 toward the front driver position 310 to provide a virtual straight-line array aimed at the front driver position 310. In one example, the determined angle (A) 502 may be about 18.8 degrees.

FIG. 6 is a table providing example shift values and corresponding delays for each loudspeaker (N) 602 in the loudspeaker line array 302 illustrated in FIG. 5. The shift values 604 represent the distance that each loudspeaker 602 in the loudspeaker line array 302 should be shifted, or physically moved, to reform the array as a straight line aimed at the front driver position 310. The delay 606 in milliseconds provides an example delay of each loudspeaker 602 that simulates the amount of shift or movement of each loudspeaker 602. The sample number 608 is representative of the clock speed at which an example signal processing system operates. Accordingly, the delay may be rounded to coincide with the clock speed of the signal processing system. In FIG. 6, the clock speed of the example signal processing system is 48 kHz.

In this example configuration, the positive imaging characteristics of the previous configurations were experienced, but now at the front driver location 310. Pin-point imaging was preserved all along the horizontal line of the loudspeaker line array 302. Center images were particular impressive due the combination of the direct sound impulses and the reflected sound impulses and the crosstalk cancellation to form a narrowed and focused sound beam. It was perceived that the center images seemed to originate from the center of the loudspeaker line array 302 at the elevation of the direct impulses and the reflected impulses, as if only a source at that location were operating.

Figure 7:
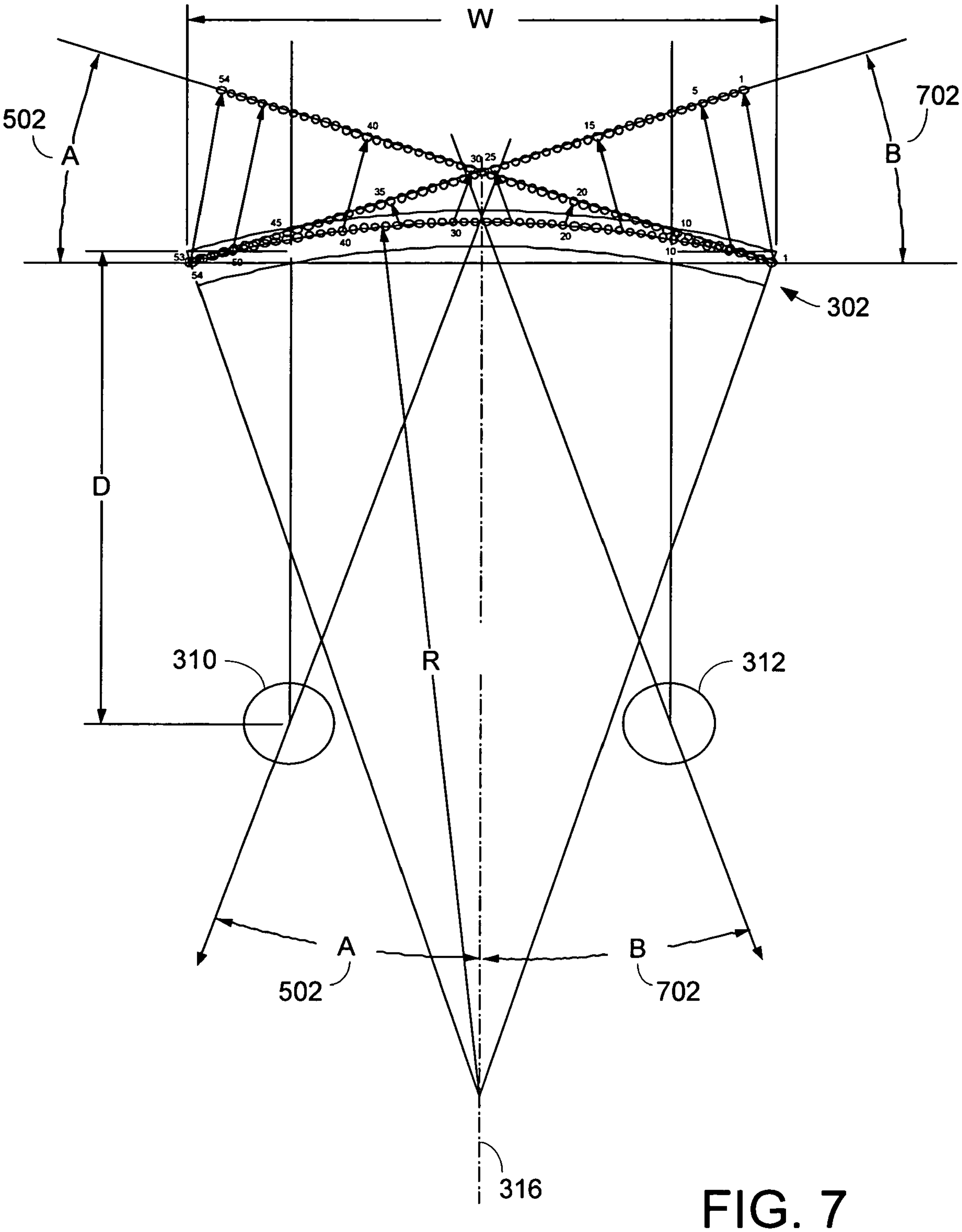
FIG. 7 is a schematic diagram of still another example loudspeaker array as depicted in FIG. 1.

FIG. 7 is a schematic diagram of the loudspeaker line array 302 in yet another example configuration. This example configuration is configured to provide sound field coverage of audio content for both the front driver location 310 and the front passenger location 312. To provide such dual sound field coverage, alternate loudspeaker drivers in the loudspeaker line array 302 may be respectively aimed at the front driver position 310 and/or at one or more of the passengers in the vehicle using delays. In this example, the loudspeaker line array 302 was simultaneously aimed at both the front driver position 310 and the front passenger position 312 to obtain sound field coverage on both sides of the vehicle at the same time and provide audio content.

Portions of the loudspeaker line array 302 were straightened and aimed at a determine angle (A) 502 toward the front driver position 310 to provide a first virtual straight-line array aimed at the front driver position 310. In addition, portions of the loudspeaker line array 302 were straightened and aimed at a determine angle (B) 702 toward the front passenger position 312 to provide a second virtual straight-line array aimed at the front passenger position 312. Accordingly, a first portion of the sound field produced by the loudspeaker line array 302 may be aimed in a first direction and a second portion of the sound field produced by the loudspeaker line array 302 may be aimed in a second direction. In the illustrated example, the determined angles were each about 18.8 degrees.

In the example configuration, all even numbered loudspeaker drivers in the loudspeaker line array 302 were aimed at the front driver position 310 and all odd numbered loudspeaker drivers were aimed at the front passenger position 312. In other examples, other configurations of the array may be used, such as, predetermined groups of loudspeakers in the array, repetitive patterns of loudspeakers in the array, etc, to aim the array at the front driver position and/or one or more passenger positions in a vehicle.

In still other examples, the loudspeaker line array 302 may be dynamically adjusted to maximize coverage based on variable vehicle related parameters such as vehicle occupancy, seat positions, window positions, etc. Dynamic adjustments of the loudspeaker line array 302 may be performed automatically by the audio processing system 104 (FIG. 1). The dynamically adjusted configurations may be adjusted automatically based on external sensors, user configurable settings, or any other variable parameters that may be used to identify a particular configuration of the loudspeaker line array 302. For example, the user configurable setting may be a switch or button to manually change the pattern coverage. In addition, the loudspeaker line array 302 may be dynamically aimed based on the audio content or program material driving the loudspeakers in the loudspeaker line array 302. For example, the imaging produced by the loudspeaker line array 302 for music may be different than the imaging for speech, such as a telephone conversation. Detection of the audio content or program material may be automatic, based on the origin, such as a CD player or a cellular phone, of the audio content or program material, or manual based on a user configurable setting(s).

The loudspeaker line array 302 may also be configured to provide sound field management for each of one or more occupants in the vehicle. For example, the loudspeaker line array 302 may be configured to produce a privacy zone for a particular seat location in a vehicle. The privacy zone may be created using a portion of the loudspeaker line array 302 to aim desired audio content at a desired location, and using another portion of the loudspeaker line array 302 to aim inverted audio content to cancel sound "leaking" from around the desired location. This may be referred to as a null zone. The inverted audio content may also be further delayed, in addition to aiming, to effectively cancel the "leaking" sound.

For example, when a first vehicle occupant is listening to a talk show while a second vehicle occupant receives navigation directions, the audio content of the navigation directions in the sound field of the first occupant may be cancelled by the inverted sound field of the navigation directions. Similarly, the audio content of the talk show may be inverted and aimed into the second occupant's sound field to cancel "leakage" from the sound field of the first occupant. Accordingly, by aiming audio content with selected drivers in the loudspeaker line array 302, sound cancellation may be maximized. Such precise aiming and coverage pattern-ability is made possible by the vertically and laterally narrowed and focused perceived beam of sound produced by the loudspeaker line array 302. Not only is substantially precise cancellation possible, but minimization of cross talk due to the cross talk cancellation also maximizes the privacy of the privacy zone(s).

In another example configuration the loudspeaker line array 302 was driven by a stereo signal as previously discussed, without shading but was aimed simultaneously at both the front driver position 310 and the front passenger position 312 using multiple delays applied to each of the loudspeakers in the loudspeaker line array 302. This example configuration allows all the loudspeakers to cover multiple positions in the vehicle at the same time. In addition, this example configuration effectively creates two virtual straight-line arrays crossed at the centerline 316. Multiple delays may be used to create imaging within a vehicle occupant's sound field representative of multiple sources of audio content, such as representations of a right rear or left rear loudspeaker positioned behind the occupant. The use of multiple delays may also be used to simulate surround sound, logic 7 or other multi-channel output sound field effects. In addition, the loudspeaker line array 302 may be configured to cooperatively operate with other loudspeakers within the vehicle, such as the previously discussed woofers, to further enhance an occupant's sound field and/or the imaging therein.

In still another example configuration the loudspeaker line array 302 was driven by a stereo signal and aimed at the front driver position 310 as previously discussed with reference to FIG. 5. In this example, the audio signals provide to selected loudspeaker drivers within the loudspeaker line array 302 were attenuated to further aim the sound field imaging produced by the loudspeaker line array 302. This form of attenuation may be referred to as Legendre shading, and may be determined with the Legendre shading function. In the example configuration, the audio signals to the center loudspeaker drivers in the loudspeaker array (such as drivers 20-30) were at full amplitude, and the audio signal levels were gradually and uniformly decreased so that the drivers at the outside edges of the loudspeaker line array 302 were attenuated by a determined amount, such as about +12 dB.

In an alternative example configuration, the level of the audio signals provided to the outside loudspeaker drivers may be at full amplitude and the amplitude of audio signals may be smoothly attenuated to decrease a determined amount, such as about −12 dB at the loudspeaker drivers near the central axis 316 of the loudspeaker line array 302. In yet another example, the loudspeaker line array 302 may be divided into a first section and a second section. The level of the audio signals provided to the loudspeaker drivers at the center of each respective section may be at full amplitude, and the amplitude of audio signals may be smoothly attenuated to decrease a determined amount, such as about −12 dB at the loudspeaker drivers near the periphery of the respective sections. In other examples, other configurations of Legrandre shading functions may be used to create constructive and destructive sound waves and provide beam aiming within a sound field produced by the loudspeaker line array 302.

In still one more example configuration, the loudspeaker line array 302 was driven by a stereo signal without shading or delays. In this example configuration, the loudspeaker array was divided into three equal sections: left: loudspeaker drivers 1-18, center: loudspeaker drivers 19-36, and right: loudspeaker drivers 37-54. The left stereo signal (L) was routed to the left group of loudspeakers, the right stereo signal (R) was routed to the right group of loudspeakers, and a mono left plus right stereo signal (L+R) was routed to the center group of loudspeakers. Once again the focused and narrow vertical and lateral coverage pattern of the loudspeaker line array 302 provided the perception of sharp imaging in each of the three sections. In other examples, the loudspeaker line array 302 may be divided into any number of sections to simulate various imaging and/or null zones as previously discussed.

The previously discussed sound system includes a loudspeaker line array configured to be installed in a vehicle. The loudspeaker line array is configured to be positioned on a horizontal shelf in the vehicle in close proximity to a sound reflective surface. When each of the loudspeakers included in the array are driven by one or more audio signals, a sound field or sound beam is produced. The sound field is formed from the combination of direct sound and reflected sound. The direct sound and reflected sound from each of the loudspeakers are combined to form widened vertical coverage and narrow, focused highly laterally directed coverage. As a result, a laterally sharp well-defined image, and a vertically sharp well defined image are perceived by a listener positioned in the near field produced by the loudspeaker line array. Due to the combination of the direct sound and the reflected sound, the sensitivity and the amplitude of the sound waves is increased. In addition, pinpoint imaging of the sound source is manifested along the length of the loudspeaker line array.

While various embodiments of the invention have been described, it will be apparent to those of ordinary skill in the art that more embodiments and implementations are possible that are within the scope of the invention.

What is claimed is:

1. An audio system for use in a vehicle, the audio system comprising:

a line array of at least four loudspeakers; and a shelf configured to be installed in the vehicle, where the array is mounted on the shelf and positioned adjacent to a sound reflective surface that extends above the shelf, and the sound reflective surface forms an angle between the shelf and the sound reflective surface; where the line array is positioned juxtaposed to a convergence of the sound reflective surface and the shelf, and where the loudspeakers are positioned on the shelf with respect to the sound reflective surface so that a first direct sound impulse provided by each of the loudspeakers is constructively combined with a reflected sound impulse created by reflection from the sound reflective surface of a second direct sound impulse provided by the same loudspeaker that provided the first direct sound impulse.

2. The audio system of claim 1, where the loudspeakers are omni-directional, and are configured to enable coverage pattern control in a horizontal axis of a sound field generated by the loudspeakers.

3. The audio system of claim 1, where the shelf has a length that extends to substantially a width of the vehicle, and the loudspeakers are positioned in the shelf substantially equidistant from each other along the length.

4. The audio system of claim 1, where the loudspeakers are positioned contiguously to each other to form a single line that substantially extends a length of the shelf.

5. An audio system for use in a vehicle, the audio system comprising:

a single line array of at least four loudspeakers; and a shelf configured to be installed in the vehicle, the line array mounted at a peripheral edge of the shelf;

where the peripheral edge is positioned in the vehicle adjacent a sound reflective surface that forms an angle with the shelf so that the single line array is configured for constructive combination of direct sound impulses from one of the loudspeakers with reflected sound impulses that result from reflection of the direct sound impulses by the sound reflective surface.

6. The audio system of claim 5, where constructive combination of the direct sound impulses and the reflected sound impulses is a result of a distance between the line array and the sound reflective surface.

7. The audio system of claim 5, where a plurality of loudspeakers in the single line array are selectively provided delayed audio signals based on at least one changeable parameter associated with the vehicle.

8. The audio system of claim 7, where the at least one changeable parameter is a user configurable setting.

9. The audio system of claim 7, where the at least one changeable parameter is an indication of audio content related to a phone conversation.

10. The audio system of claim 5, where a plurality of loudspeakers in the single line array are selectively provided a first group of delayed audio signals when the audio content is music and a second group of delayed audio signals when the audio content is voice.

11. The audio system of claim 5, where a plurality of loudspeakers in the single line array are provided delayed audio signals to aim audio content at both a first predetermined location and a second predetermined location.

12. The audio system of claim 5, where a first group of loudspeakers in the single line array are provided a delayed audio signal to aim audio content at a first predetermined location and a second group of loudspeakers in the single line array are provided a delayed audio signal to aim audio content at a second predetermined location.

13. The audio system of claim 12, where each of the loudspeakers in the first group is positioned adjacent to at least one of the loudspeakers in the second group.

14. The audio system of claim 5, where the single line array is configured with a first portion of the single line array to aim non-inverted audio content at a first predetermined location and a second portion of the single line array to aim the same audio content that has been inverted at a second predetermined location to cancel said non-inverted audio content.

15. The audio system of claim 14, where the non-inverted audio content is aimed using delay, and where the same audio content that has been inverted has been aimed using delay and the same audio content that has been inverted is also subject to additional delay.

16. The audio system of claim 5, where the constructive combination results in a sound field frequency response that averages less than plus and minus 5 decibels between 100 hertz and 10,000 hertz.

17. An audio system for use in a vehicle, the audio system comprising:

a plurality of loudspeakers formed in a line array;

a direct sound impulse produced by each of the loudspeakers; and a reflected sound impulse produced by reflection of a portion of the direct sound impulse with a sound reflective surface;

where the direct sound impulse and the reflected sound impulse combine substantially in phase due to a distance between the loudspeakers and the sound reflective surface.

18. The audio system of claim 17, where the loudspeakers are formed in a curved line array that has a radius of curvature that substantially corresponds to a radius of curvature of the sound reflective surface.

19. The audio system of claim 17, where the line array is positioned in a shelf at a point where the line array converges with the sound reflective surface to form an angle.

20. The audio system of claim 19, where the shelf is a longitudinally extending surface and the sound reflective surface longitudinally extends adjacent to the shelf such that the line array is positioned to at least partially face toward the sound reflective surface.

21. The audio system of claim 17, where the direct sound impulse and the reflected sound impulse are produced from a single loudspeaker in the line array.

22. The audio system of claim 17, where substantially in phase is when the phase shift between the direct sound impulse and the reflected sound impulse is less than 90 degrees out of phase between 100 Hz and 10 kHz.

23. An audio system for use in a vehicle, the audio system comprising:

a line array of at least four loudspeakers, the at least four loudspeakers contiguously positioned in the line array to form a single line; and a shelf configured to be installed in the vehicle, where the array is coupled to the shelf and positioned adjacent to a window in the vehicle that extends above the shelf and the shelf forms an angle between the shelf and the window, where the line array is juxtaposed to a convergence of the window and the shelf; and where the at least four loudspeakers are positioned on the shelf with respect to the window so that a first direct sound impulse provided by each of the at least four loudspeakers is constructively combined with a reflected sound impulse created by reflection from the window of a second sound impulse provided by the same loudspeaker that provided the first direct sound impulse.

24. The audio system of claim 23, where the at least four loudspeakers each have a diameter of less than 50 millimeters.

25. The audio system of claim 23, where a distance between the at least four loudspeakers and the window is minimized.

26. The audio system of claim 23, where a distance between the at least four loudspeakers and the window is determined so that a phase difference between the first direct sound impulse and the reflected sound impulse is less than 90 degrees.

* * * * *